United States Patent [19]

Van Daele

[11] Patent Number: 5,158,207

[45] Date of Patent: Oct. 27, 1992

[54] LEAK DETECTION DEVICE

[75] Inventor: John J. Van Daele, Fort Wayne, Ind.

[73] Assignee: Tokheim Corporation, Fort Wayne, Ind.

[21] Appl. No.: 700,754

[22] Filed: May 15, 1991

[51] Int. Cl.⁵ .............................................. B67D 5/08
[52] U.S. Cl. ...................................... 222/52; 222/23; 251/46; 251/297
[58] Field of Search .................... 222/23, 52; 137/551, 137/557; 251/46, 297

[56] References Cited

U.S. PATENT DOCUMENTS

| | | | |
|---|---|---|---|
| 2,952,387 | 9/1960 | Fowler et al. | 222/52 |
| 3,183,723 | 5/1965 | Deters | 222/52 X |
| 3,454,195 | 7/1969 | Deters | 222/52 |
| 3,866,798 | 2/1975 | Marsh | 222/52 |
| 3,940,020 | 2/1976 | McCrory et al. | 222/52 |
| 4,131,216 | 12/1978 | Gerstenmaier et al. | 222/52 |
| 4,309,022 | 1/1982 | Reinicke et al. | 251/297 X |
| 4,410,109 | 10/1983 | Murrell, Jr. et al. | 222/52 |
| 4,658,986 | 5/1987 | Freed et al. | 222/52 |
| 4,679,587 | 7/1987 | Jarr | 137/509 |

Primary Examiner—Michael S. Huppert
Assistant Examiner—Gregory L. Huson
Attorney, Agent, or Firm—Baker & Daniels

[57] ABSTRACT

A leak detection device for restricting the flow of liquid fuel through the undergound fuel conduit whenever the leakage exceeds a predetermined rate of flow. The device includes a valve in the conduit that is movable between a first position to permit a first volumetric rate of flow for quickly pressurizing the conduit to a predetermined pressure, and a second position to permit a second volumetric rate of flow is that is much less that the first volumetric rate of flow. The valve includes a seal member which is extendable radially outward of the valve. A valve seat for the valve is provided and has a plurality of slots therein to provide fluid communication between the fuel inlet and outlet of the device. Once the conduit is pressurized to the predetermined pressure, the valve moves from its first position to its second position resulting in the seal member being sealingly aligned with each of the slots thereby preventing the flow of the fuel through each of the slots.

10 Claims, 2 Drawing Sheets

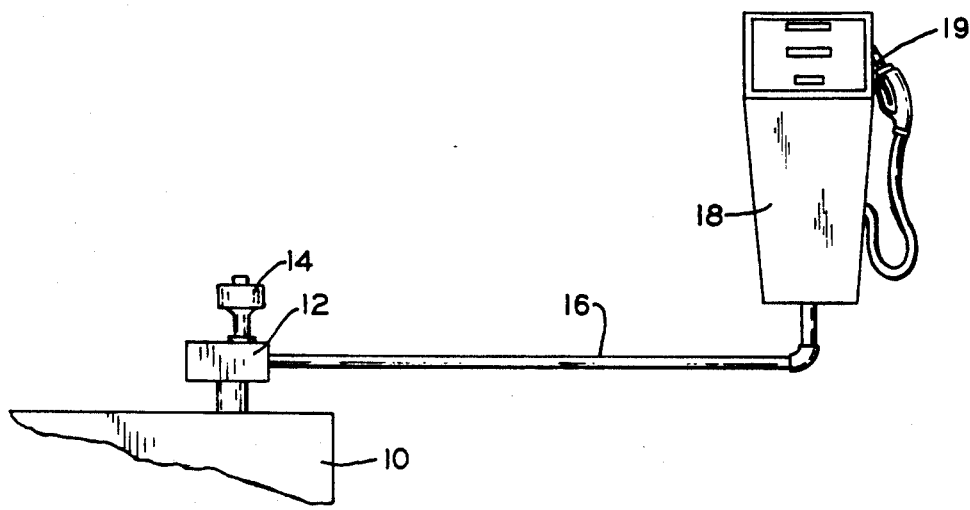
FIG_1
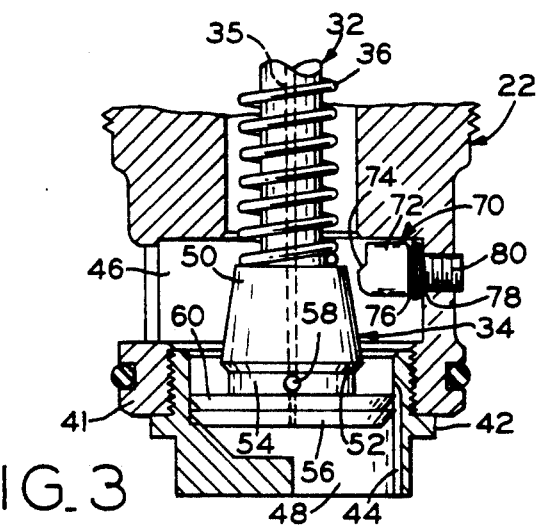
FIG_3
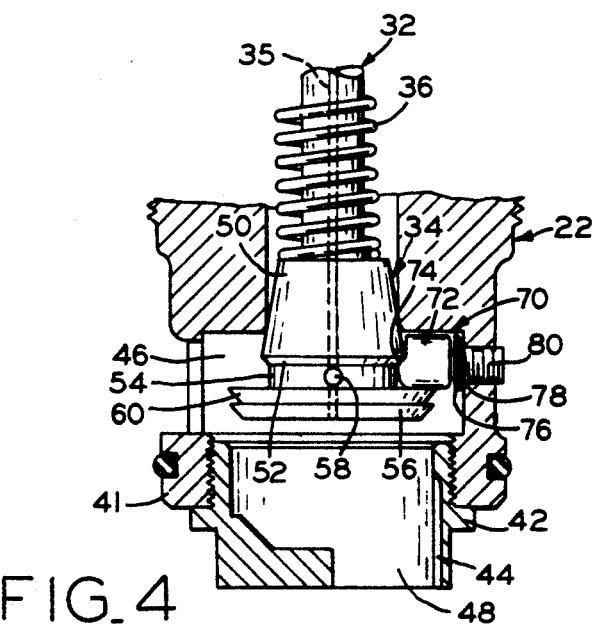
FIG_4

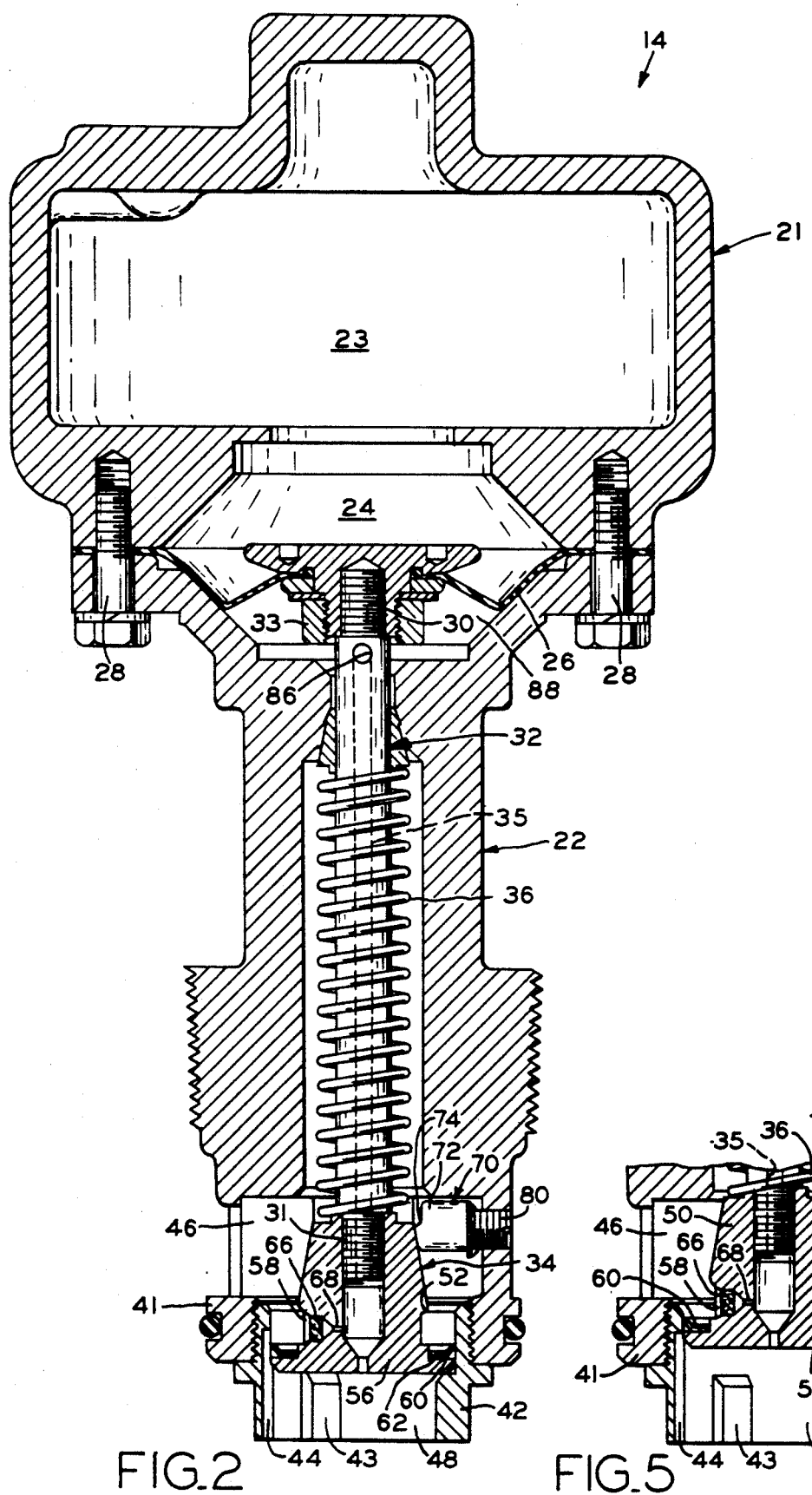

with the detector valve inadvertently closing during the dispensing of fuel into the motor vehicle. As several nozzles within the fuel dispensing system are simultaneously opened, the pressure in the conduit can drop significantly to as low as about 12 psi, whereas normal operating pressure is about 25 psi. If the submerged pump cannot maintain a sufficient pressure within the conduit while several nozzles are open, there is a possibility that the detector valve will close thereby restricting flow to all of the nozzles and frustrating the operators. It is desired to provide a leak detection device that overcomes these problems.

LEAK DETECTION DEVICE

BACKGROUND OF THE INVENTION

The present invention relates generally to devices for detecting fuel leaks in liquid fuel dispensing systems. More particularly, the present invention relates to a leak detection device having a valve that is inserted in the fuel conduit and which prevents the full flow of fuel upon the occurrence of a leak in the conduit, thereby alerting the operator that a leak exists in the system.

Fuel dispensing stations generally include a large amount of underground piping that is required to produce the fuel supply lines that extend from the underground fuel storage tank to the remote dispensing units. Since the supply lines are disposed underground, any leaks in the lines cannot ordinarily be detected by visual inspection. Consequently, there is the possibility that a leak in an underground line may go unnoticed over a period of time, resulting in the accumulation of flammable fuel in and around the area, thus creating a potentially hazardous condition.

In order to prevent this dangerous condition, leak detectors have been utilized for sensing leakage from underground piping. Typically, such detectors are positioned adjacent the underground fuel storage tanks and monitor the downstream pressure of the liquid fuel in the supply lines between the storage tank and the individual dispensing units. The detectors include a valve that is connected to the supply line. When the submerged pump is actuated, a controlled rate of flow of fuel is initially metered through the detector valve into the supply line. This rate of flow is the maximum rate of leakage of fluid permitted from the underground piping. If a leak is present downstream that equals or exceeds this rate of flow, liquid escapes from the supply line at least the same rate that it enters. In this case, the valve assumes a closed position to restrict the rate of flow greatly below the full rate of flow upon opening of the dispenser nozzle, thereby indicating to the operator that a leak is present in one of the underground supply lines. If no leaks are present, pressure builds up rapidly in the system and causes the detector valve to fully open to allow the fuel to flow at its full rate when the nozzle is opened.

The detection of leaks by pressure sensing detectors is complicated by the fact that fuel is only intermittently pumped through the supply lines. When the pump is started, and the nozzle at the remote dispenser is closed, the pressure in the line will build up to substantially full discharge pressure. When the nozzle is opened, the pressure will drop. While the pump is inactive, the pressure in the line may also vary due to thermal expansion and contraction of the fuel in the line due to changes in temperature. For example, fuel that is pumped from a warm storage tank to cold supply piping can contract significantly, thus decreasing the pressure sufficiently to close the detector valve thereby giving a false indication of a leak and frustrating the operator attempting to dispense the fuel into the gas tank of a vehicle. It is thus necessary to initially pressurize the piping to eliminate the effects of intermittent pump use and thermal contraction. Once pressurized to a predetermined pressure, leak detection may take place.

In the past, metering pins have been used for the dual functions of controlling initial quick pressurization of the system and metering the leak detection rate. The system is initially pressurized by the flow of fuel through a channel between the metering pin and a conduit connecting the fuel inlet and outlet of the detection device. While the system is being initially pressurized, the channel is large enough to allow fuel to flow therethrough at several gallons per minute to provide initial quick pressurization of the downstream conduit. Once the system is sufficiently pressurized, the channel is positioned directly adjacent the metering pin to limit the flow rate through the channel to only several gallons per hour so that leak detection can take place. Due to the bifunctional nature of the metering pins, problems have been encountered in the manufacture, calibration, and operation of the pins.

In addition to problems experienced with metering pins, leak detection devices have experienced problems

SUMMARY OF THE INVENTION

The present invention provides a leak detection device having a metering passage and a separate quick pressurization passage that is closed in response to the attainment of a predetermined pressure in the fluid conduit. If no leaks are present in the conduit, the leakage of fuel through the metering passage builds additional pressure in the conduit, thereby moving the detector valve from a closed position to an open position, whereupon a spring-biased latch engages the valve. The latch provides a holding force on the valve sufficient to retain the valve in its open position during the dispensing of fuel. After the fuel has been dispensed, the pressure in the conduit drops to its resting pressure while the latch continues to engage the valve. If a pressure loss occurs in the conduit due to a leak or thermal contraction, the holding force is insufficient to hold the valve in its open position, whereupon the valve is released and returns to a closed position for leak detection to again take place.

Generally, the present invention provides in one form thereof a leak detection device for use in a liquid fuel dispensing system in which the device includes a detector valve in the conduit, a quick pressurization passage to quickly pressurize the conduit for leak detection testing, and a metering passage to permit a predetermined rate of fuel flow through the conduit. If no leak is present in the conduit, the pressure in the conduit increases due to the flow of liquid fuel through the metering passage thereby moving the valve from a closed position to an open position to allow an operational flow of fluid through the conduit. A spring-biased latch engages the valve when the valve is in an open position to provide a holding force on the valve sufficient to retain the valve in the open position during operational flow.

More specifically, the present invention in one form thereof provides a leak detection device including a detector valve in the liquid fuel conduit and a valve seat for housing the valve. The valve seat includes a plurality of slots therein for providing a quick pressurization passage between the inlet and outlet of the detection device. The valve includes a seal member, so that upon attainment of a predetermined pressure in the conduit, the valve moves from a first position to a second position, thereby aligning the seal member with each of the slots to seal the slots and prevent the flow of fluid therethrough.

One advantage of the leak detector of the present invention is that the quick pressurization passage is separate and distinct from the metering passage thereby eliminating the need for metering pins and improving reliability of the detector by eliminating any interference between the quick pressurization function and the metering function.

Another advantage of the leak detector of the present invention is that a filter is provided in the metering passage to remove impurities which may tend to clog up the small orifice incorporated in the poppet valve.

Another advantage of the leak detector of the present invention is that the metering passage is essentially self-cleaning.

A further advantage of the leak detector of the present invention is that a spring-biased latch member is provided for retaining the valve in its open position at lower operating pressures caused by the simultaneous opening of several nozzles.

The present invention in one form thereof, provides a liquid fuel dispensing system including a liquid fuel reservoir, a valved nozzle, a fuel conduit providing fluid communication between the reservoir and the nozzle, and a pump proximate the reservoir for pumping liquid fuel through the conduit. A leak detector is provided for detecting leakage of liquid fuel from the conduit and for restricting the flow of liquid fuel through the conduit whenever the leakage exceeds a predetermined rate of flow. The detector includes a fluid inlet opening, a fluid outlet opening, a metering passage, and a quick pressurization passage. The metering passage, which is in constant fluid communication with the inlet opening and the outlet opening, meters the liquid fuel through the outlet opening at the predetermined rate of flow. The quick pressurization passage provides a conduit for a volumetric rate of flow which is greater than the predetermined rate of flow. In response to the attainment of a predetermined pressure in the conduit, the quick pressurization passage is closed.

The present invention in one form thereof, provides a liquid fuel dispensing system including a liquid fuel reservoir, a valved nozzle, a fuel conduit providing fluid communication between the reservoir and the nozzle, and an actuable pump proximate the reservoir for providing pumping pressure to pump the fuel through the conduit when actuated. There is a resting pressure in the conduit while the pump is not activated, a maximum pumping pressure while the pump is actuated and the valved nozzle is closed, and a reduced operating pressure while the pump is actuated and the valved nozzle is open. A detector is provided for detecting leakage of liquid fuel from the conduit and for restricting the flow of liquid fuel through the conduit whenever the leakage exceeds a predetermined rate of flow. The detector includes a detector valve in the conduit and has a closed position and an open position. The valve includes a spring for applying a closing force on the valve sufficient to move the valve to the closed position when the pressure of fuel in the conduit falls below resting pressure to a predetermined value. The valve is movable to the open position while the fuel in the conduit is at the maximum pumping pressure. The detector is provided with a spring-biased latch that engages the valve when the valve is moved to the open position. The latch provides a holding force on the valve sufficient to retain the valve in the open position while the fuel in the conduit is at reduced operating pressure and at resting pressure. The holding force is insufficient to hold the valve in the open position when pressure of the fuel in the conduit falls to a predetermined amount below resting pressure, thereby permitting the valve to return to the closed position.

BRIEF DESCRIPTION OF THE DRAWINGS

FIG. 1 is diagrammatic view of a typical fuel dispensing installation that includes the leak detection device according to the present invention;

FIG. 2 is an enlarged, cross-sectional view of the leak detection device of FIG. 1, particularly showing the valve in its closed position;

FIG. 3 is a fragmentary view of the leak detection device of FIG. 2, rotated 90° about its longitudinal axis and particularly showing the valve in its closed position;

FIG. 4 is a view of FIG. 3, particularly showing the valve in its fully opened position; and FIG. 5 is a fragmentary view of the leak detection device of FIG. 2, particularly showing the valve in its metering position.

DESCRIPTION OF THE PREFERRED EMBODIMENT

Referring to FIG. 1, there is shown a typical fuel dispensing installation including an underground liquid storage tank 10. The fuel from storage tank 10 is pumped by submersible pump 12 through a leak detection device 14 of the present invention and into supply line 16. The fuel is then dispensed to any one of a plurality of dispensers 18 having nozzles 19.

Referring to FIG. 2, leak detection device 14 includes a chamber housing section 21 and a valve housing section 22. Chamber section 21 includes an upper diaphragm chamber 23 and a lower diaphragm chamber 24 in communication with upper chamber 23. A flexible diaphragm 26, preferably made of a fluorosilicon, is disposed between chamber housing 21 and valve housing 22, which are secured together by threaded bolts 28. An axially movable shaft 32 is disposed in valve housing 22. Diaphragm 26 is coupled to upper end 30 of shaft 32 by a nut 33. A small passage 35 is formed within shaft 32 and extends nearly the entire length of the shaft. The lower end 31 of shaft 32 is coupled to a poppet valve assembly 34, which is biased downwardly to a closed position by a return spring 36. As shown in FIG. 2, lower portion 31 is narrowed within valve assembly 34. Valve assembly 34 is housed within a plastic valve seat 42 that is threadedly secured to bottom portion 41 of valve housing 22. Seat 42 includes a plurality of integrally formed stop portions 43 and a plurality of axially extending slots 44 for providing fluid communication between fuel inlet passage 46 and fuel outlet passage 48.

Referring to FIGS. 3 and 4, valve assembly 34 includes a generally trapezoidal upper portion 50 and a reduced diameter portion 54. A transition region between upper portion 50 and reduced diameter portion 54 is shown at 52. A lower bevelled portion 56 extends radially outwardly of reduced diameter portion 54 to engage the walls of the outlet passage 48 for preventing the flow of fuel therethrough. Reduced diameter portion 54 includes an opening 58 therein in communication with passage 35 for permitting the continuous flow of a small volume of liquid fuel between inlet passage 46 and outlet passage 48. Referring to FIGS. 2 and 5, there is shown a cupped seal member 60 secured to the upper surface of bevelled portion or valve 56 by a retaining ring 62. Preferably, seal member 60 is made of a filled Teflon material. A filter 66 is provided in opening 58 for filtering out impurities such as mud from the gasoline upon fluid flow through small metering passage 68.

Valve assembly 34 may assume three different positions as illustrated in the drawings. FIGS. 2 and 3 illustrate valve 56 of assembly 34 in a closed position to prevent fluid communication between inlet passage 46 and outlet passage 48. FIG. 5 illustrates valve assembly 34 in a metering position after conduit 16 is initially pressurized for leak detection. FIG. 4 illustrates valve assembly 34 in its open flow position, to allow full flow from inlet passage 46 to outlet passage 48.

In order to retain valve assembly 34 its open position, a pair of latch members 70 are provided. Latch member 70 includes a pawl portion 72 having a shoulder 74, which generally corresponds to the shape of transition portion 52 of valve assembly 34 as shown in FIG. 4. Latch member 70 further includes a flat washer 76, a curved spring washer 78 and a latch stud 80.

As previously described, FIG. 2 illustrates valve assembly 34 in its initial closed position. While in this position, lower portion 56 and seal member 60 of valve assembly 34 sealingly engages the wall of fuel outlet passage 48 to prevent the full flow of fuel between inlet passage 46 and outlet passage 48. Initially, when supply pump 12 is actuated by an operator while the valve assembly is in this position, fuel is communicated substantially from inlet passage 46 to outlet passage 48 via slots 44 in valve seat 42. The flow of fuel through outlet passage 48 pressurizes downstream conduit 16. In addition to the flow of fuel through slots 44, a relatively small amount of fuel is continuously communicated from inlet passage 46 to outlet passage 48 via opening 58 and small passage 68 in valve assembly 34.

When the supply pump is actuated, fuel flows through slots 44 at a rate of several gallons per minute so that after several seconds, conduit 16 is sufficiently charged to a predetermined pressure to allow leak detection to take place. It should be noted that poppet valve seat 42 can be modified by changing the number, configuration, or terminations of axial slots 44. The configuration and number of slots 44 determine the rate of initial pressurization of downstream conduit 16 and also determine the leak signal rate. It is also noted that slot termination and the force constant of spring 36 define the pressure at which the system will perform the leak monitoring function.

As the pressure increases in conduit 16 due to the flow of liquid fuel through slots 44, fuel flows upward from outlet passage 48 through passage 35 in shaft 32. The fuel then exits through opening 86 in shaft 32 and collects in sealed chamber area 88. As the pressure in chamber 88 increases, diaphragm 26 is forced upwardly to slightly raise shaft 32 and valve assembly 34 to the position illustrated in FIG. 5. As valve assembly 34 moves upwardly, seal member 60 is "wiped" along slots 44 until it is positioned to seal the entrance to slots 44 from the fuel thereby preventing fuel from flowing through the slots. While in this position, fuel flow between inlet passage 46 and outlet passage 48 is limited to the flow of fluid through opening 58 into outlet passage 48. The diameter of opening 68 can be varied to vary the rate of fuel flow therethrough and thus the leak detection rate. A preferred leak detection rate is about 2.5 to 3 gallons per hour; however, other rates are possible.

If there is no leak in downstream conduit 16, the pressure previously built up in conduit 16 and outlet passage 48 will force the additional fluid to travel through passage 35 and through opening 86 into chamber area 88, thereby exerting more upward force on diaphragm 26. As diaphragm 26 moves upwardly against the trapped air in lower diaphragm chamber 24, shaft 32 and valve assembly 34 will move upwardly until valve assembly 34 assumes the open position illustrated in FIG. 4, thereby permitting full flow between inlet passage 46 and outlet passage 48. In this position, latch member 70 engages valve assembly 34 to retain valve 56 in its open position. Latch member 70 may be of various designs and still function similarly.

If there is a leak in downstream conduit 16 that is equal or greater than that rate of flow through opening 68, the pressure downstream will not generate the upward force against diaphragm 26 sufficient to open valve assembly 34 to allow the full flow of fuel. The absence of full fuel flow at the nozzle end of dispenser 18 will thus alert the operator that a leak exists in the system.

As previously explained, latch members 70 are provided to retain valve 56 in its open position while fuel is being dispensed. As valve 56 moves upwardly to its open position, upper portion 50 of valve assembly 34 engages pawl portion 72 until transition region 52 of valve assembly 34 is frictionally engaged by shoulder 74 as shown in FIG. 4. Spring washer 78 biases latch member 70 toward transition region 52, thereby providing a holding force to keep valve assembly 34 open, even if the pressure in conduit 16 falls to as low as 7 psi.

Poppet valve assembly 34 remains in its fully open position until the pressure in conduit 16 falls below a predetermined amount. At this pressure, the downward force of return spring 36 exceeds the holding force supplied by latch member 70 so that valve assembly 34 returns to its initial position as shown in FIGS. 2 and 3. As valve assembly 34 returns to a closed position, a localized area of relatively high pressure is created within the valve assembly, thus tending to purge opening 58 of possible obstructing contaminates. Generally the pressure would drop due to a leak in the system; however, the pressure drop could also occur due to thermal contraction.

It will be appreciated that the foregoing is presented by way of illustration only, and not by way of any limitation, and that various alternatives and modifications may be made to the illustrated embodiment without departing from the spirit and scope of the invention.

What is claimed is:

1. In a liquid fuel dispensing system including a liquid fuel reservoir, a valved nozzle, a fuel conduit providing fluid communication between the reservoir and the nozzle, and pump means proximate the reservoir for pumping fuel through the conduit, a detector for detecting leakage of liquid fuel from the conduit and for restricting the flow of liquid fuel through the conduit whenever the leakage exceeds a predetermined rate of flow, said detector comprising:

a fluid inlet opening and a fluid outlet opening;

metering passage means for metering the liquid fuel through said outlet opening at said predetermined rate of flow, said metering passage means being in constant fluid communication with said inlet opening and said outlet opening;

quick pressurization passage means for providing a volumetric rate of flow which is greater than said predetermined rate of flow; and means for closing said quick pressurization passage means in response to the attainment of a predetermined pressure in the conduit.

2. The dispensing system according to claim 1, wherein a filter is disposed in said metering passage means for filtering impurities in the liquid fuel a it flows through said metering passage means.

3. The dispensing system according to claim 1, wherein said detector includes a detector valve in the conduit and a valve seat structured and arranged for housing said valve, said quick pressurization passage means comprising a plurality of slots in said valve seat.

4. The dispensing system according to claim 3, wherein said valve is movable between a first position, which permits said volumetric rate of flow to quickly pressurize the, conduit and a second position, which permits said predetermined rate of flow, said means for closing said quick pressurization passage means including a seal member attached to said valve, wherein upon attainment of said predetermined pressure, said valve moves from said first position to said second position resulting in said seal member being in sealing alignment with said slots, thereby preventing the flow of fluid through each said slot.

5. The dispensing system according to claim 3, wherein said detector includes a spring-biased latch engageable with said valve, said valve being movable to an open position, said latch engaging said valve and retaining said valve in said open position.

6. In a liquid fuel dispensing system including a liquid fuel reservoir, a valved nozzle, a fuel conduit providing fluid communication between the reservoir and the nozzle, and pump means proximate the reservoir for pumping fuel through the conduit, a detector for detecting leakage of liquid fuel from the conduit and for restricting the flow of liquid fuel through the conduit whenever the leakage exceeds a predetermined rate of flow, said detector comprising:

a housing including, a fluid inlet opening, a fluid outlet opening, and a chamber;

a diaphragm mounted in said chamber and movable in response to a pressure differential across said diaphragm;

a detector valve in the conduit and coupled to said diaphragm for movement therewith, said valve including a seal member;

said valve being shiftable between a first position, which provides a first volumetric rate of flow to quickly pressurize the conduit to a predetermined pressure, and a second position, which provides a second volumetric rate of flow which is much less than said first volumetric rate of flow so that leakage detection may occur;

a valve seat for housing said valve, said valve seat including a plurality of slots therein for providing fluid communication between said inlet and said outlet while said valve is in said first position until the conduit is pressurized to said predetermined pressure, whereupon said valve moves to said second position resulting in said seal member being in sealing alignment with each of said slots thereby preventing the flow of fluid through said each said slot.

7. In a liquid fuel dispensing system including a liquid fuel reservoir, a valved nozzle, a fuel conduit providing fluid communication between the reservoir and the nozzle, and actuable pump means proximate the reservoir for providing pumping pressure to pump fuel through the conduit when actuated, there being a resting pressure in the conduit while the pump means is not actuated, a reduced pressure in the conduit designating a pressure below resting pressure, a maximum pumping pressure when the pump means is actuated and the valved nozzle is closed, and an operating pressure when the pump means is actuated and the valved nozzle is open, a detector for detecting leakage of liquid fuel from the conduit and for restricting the flow of liquid fuel through the conduit whenever the leakage exceeds a predetermined rate of flow, said detector comprising:

a detector valve in said conduit and having a closed position and an open position, said valve including spring means for applying a closing force on said valve sufficient to move said valve to its closed position when fuel in the conduit is at reduced pressure, said valve being movable to its open position when the fuel in the conduit is at maximum pumping pressure; and a spring-biased latch that engages said valve when said valve is moved to its open position, said latch providing a holding force on said valve sufficient to retain said valve in its open position while the fuel in the conduit is at reduced operating pressure, said holding force being insufficient to hold said valve in its open position when the fuel in the conduit is at reduced pressure, thereby permitting said valve to return to its closed position.

8. The dispensing system according to claim 7, wherein said latch includes a compression spring for providing said holding force.

9. The dispensing system according to claim 7, wherein said latch extends in a direction perpendicular to the direction of movement of said valve.

10. The dispensing system according to claim 7, wherein said valve includes a reduced diameter portion and said latch includes a notched engaging portion which is engageable with said reduced diameter portion to frictionally secure said valve in said open position.

* * * * *